US012688765B2

(12) United States Patent
Lindsey et al.

(10) Patent No.: US 12,688,765 B2
(45) Date of Patent: *Jul. 21, 2026

(54) EVENT DETECTION, EVENT NOTIFICATION, DATA RETRIEVAL, AND ASSOCIATED DEVICES, SYSTEMS, AND METHODS

(71) Applicant: LiveView Technologies, LLC, American Fork, UT (US)

(72) Inventors: Steven R. Lindsey, Orem, UT (US); Skyler J Call, Lehi, UT (US); Brandon T. Woolf, Orem, UT (US); Charles G. Hayward, Woodland Hills, UT (US)

(73) Assignee: Live View Technologies, LLC, American Fork, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,750

(22) Filed: May 3, 2024

(65) Prior Publication Data

US 2024/0290185 A1      Aug. 29, 2024

Related U.S. Application Data

(63) Continuation of application No. 18/463,705, filed on Sep. 8, 2023, now Pat. No. 12,014,612, which is a (Continued)

(51) Int. Cl.
G08B 13/196          (2006.01)
H04N 5/77            (2006.01)

(52) U.S. Cl.
CPC . *G08B 13/19673* (2013.01); *G08B 13/19656* (2013.01); *G08B 13/19669* (2013.01); *H04N 5/77* (2013.01)

(58) Field of Classification Search
None
See application file for complete search history.

(56) References Cited

U.S. PATENT DOCUMENTS 6,005,678 A     12/1999  Higashida et al.
6,097,429 A     8/2000  Seeley et al.
(Continued)

FOREIGN PATENT DOCUMENTS

CN            103559781 A     2/2014
KR     10-2011-0023634 A     3/2011
(Continued)

OTHER PUBLICATIONS

International Search Report and Written Opinion received in application No. PCT/US15/43669, dated Jan. 11, 2016, 8 pgs.
(Continued)

*Primary Examiner* — Stefan Gadomski
(74) *Attorney, Agent, or Firm* — Ray Quinney & Nebeker

(57)          ABSTRACT

Methods and systems provided. A system may include a mobile surveillance unit positioned within an environment and including one or more sensors configured to detect one or more events occurring within or near the environment. The system may also include an application program configured to: convey data related to a detected event of the one or more events to an electronic device remote from the mobile surveillance unit; and in response to input associated with the detected event, convey, from the mobile surveillance unit, image data, video data, audio data, or any combination thereof, previously captured at the mobile surveillance unit and associated with the detected event.

20 Claims, 11 Drawing Sheets

Related U.S. Application Data continuation-in-part of application No. 17/897,966, filed on Aug. 29, 2022, now Pat. No. 12,217,583, which is a continuation of application No. 16/867, 316, filed on May 5, 2020, now Pat. No. 11,495,102, which is a continuation-in-part of application No. 14/451,067, filed on Aug. 4, 2014, now Pat. No. 10,645,459.

(56)                    References Cited

U.S. PATENT DOCUMENTS

| | | | |
|---|---|---|---|
| 6,323,897 B1 | 11/2001 | Kogane et al. | |
| 6,693,530 B1 | 2/2004 | Dowens et al. | |
| 6,891,566 B2 | 5/2005 | Marchese | |
| 6,970,183 B1* | 11/2005 | Monroe | G08B 7/062 |
| | | | 348/E7.086 |
| 7,000,242 B1 | 2/2006 | Haber | |
| 7,110,025 B1 | 9/2006 | Loui et al. | |
| 7,540,011 B2 | 5/2009 | Wixson et al. | |
| 7,543,327 B1 | 6/2009 | Kaplinsky | |
| 7,639,943 B1 | 12/2009 | Kalajan | |
| 7,792,256 B1 | 9/2010 | Arledge et al. | |
| 8,098,281 B1* | 1/2012 | Croak | H04N 7/186 |
| | | | 348/143 |
| 8,350,694 B1* | 1/2013 | Trundle | G08B 25/10 |
| | | | 340/539.11 |
| 8,644,702 B1 | 2/2014 | Kalajan | |
| 8,792,563 B2 | 7/2014 | Yova et al. | |
| 8,914,526 B1 | 12/2014 | Lindquist et al. | |
| 9,143,670 B1 | 9/2015 | Cilia | |
| 9,176,643 B2 | 11/2015 | Elia et al. | |
| 9,246,915 B2 | 1/2016 | Springer | |
| 9,583,012 B1 | 2/2017 | Loftis et al. | |
| 9,860,517 B1 | 1/2018 | Ramaswamy et al. | |
| 10,645,459 B2 | 5/2020 | Lindsey et al. | |
| 11,202,003 B1 | 12/2021 | Tanner | |
| 2002/0003575 A1 | 1/2002 | Marchese | |
| 2002/0016971 A1 | 2/2002 | Berezowski et al. | |
| 2002/0089587 A1 | 7/2002 | White et al. | |
| 2002/0133486 A1 | 9/2002 | Yanagihara et al. | |
| 2002/0175917 A1 | 11/2002 | Chakravarty et al. | |
| 2002/0175995 A1 | 11/2002 | Sleeckx | |
| 2002/0178272 A1 | 11/2002 | Igarashi et al. | |
| 2003/0025599 A1 | 2/2003 | Monroe | |
| 2004/0003151 A1 | 1/2004 | Bateman et al. | |
| 2004/0095396 A1 | 5/2004 | Stavely et al. | |
| 2004/0146272 A1 | 7/2004 | Kessel et al. | |
| 2004/0258404 A1 | 12/2004 | Brown | |
| 2005/0022245 A1 | 1/2005 | Nallur et al. | |
| 2005/0091311 A1* | 4/2005 | Lund | G08B 13/19656 |
| | | | 348/E7.086 |
| 2005/0174229 A1 | 8/2005 | Feldkamp et al. | |
| 2006/0136972 A1 | 6/2006 | Metzger et al. | |
| 2006/0174302 A1 | 8/2006 | Mattern et al. | |
| 2006/0195876 A1 | 8/2006 | Calisa | |
| 2006/0279628 A1 | 12/2006 | Fleming | |
| 2007/0205888 A1 | 9/2007 | Lee et al. | |
| 2007/0262857 A1* | 11/2007 | Jackson | G08B 13/19684 |
| | | | 340/506 |
| 2008/0016541 A1 | 1/2008 | Murakami et al. | |
| 2008/0043108 A1 | 2/2008 | Jung et al. | |
| 2008/0060034 A1* | 3/2008 | Egnal | G03B 37/04 |
| | | | 348/340 |
| 2008/0085096 A1 | 4/2008 | Marshall | |
| 2008/0097970 A1 | 4/2008 | Olstad et al. | |
| 2008/0122929 A1 | 5/2008 | Chukwu | |
| 2008/0303903 A1 | 12/2008 | Bentley et al. | |
| 2009/0007188 A1 | 1/2009 | Omernick | |
| 2009/0009605 A1 | 1/2009 | Ortiz | |
| 2009/0027495 A1 | 1/2009 | Oskin et al. | |
| 2009/0046211 A1 | 2/2009 | Maekawa et al. | |
| 2009/0049384 A1 | 2/2009 | Yau | |
| 2009/0049409 A1 | 2/2009 | Leclercq et al. | |
| 2009/0066790 A1* | 3/2009 | Hammadou | H04N 23/82 |
| | | | 348/E5.062 |
| 2009/0123134 A1* | 5/2009 | Shinkai | H04N 21/4335 |
| | | | 386/200 |
| 2009/0138906 A1 | 5/2009 | Eide et al. | |
| 2009/0195655 A1 | 8/2009 | Pandey | |
| 2009/0231441 A1* | 9/2009 | Walker | H04N 1/32128 |
| | | | 348/207.1 |
| 2009/0237528 A1 | 9/2009 | Kawamura et al. | |
| 2010/0008649 A1 | 1/2010 | Watanabe et al. | |
| 2010/0042642 A1 | 2/2010 | Shahraray et al. | |
| 2010/0050124 A1 | 2/2010 | Douillet et al. | |
| 2010/0074590 A1 | 3/2010 | Momosaki | |
| 2010/0104146 A1 | 4/2010 | Momosaki | |
| 2010/0128987 A1 | 5/2010 | Mcafee et al. | |
| 2010/0158473 A1* | 6/2010 | Wayne | H04N 9/8205 |
| | | | 386/241 |
| 2010/0274820 A1 | 10/2010 | O'Brien et al. | |
| 2011/0055765 A1 | 3/2011 | Neubrand et al. | |
| 2011/0080940 A1 | 4/2011 | Bocharov et al. | |
| 2011/0128150 A1* | 6/2011 | Kanga | H04N 7/188 |
| | | | 340/541 |
| 2011/0128382 A1 | 6/2011 | Pennington et al. | |
| 2011/0221913 A1 | 9/2011 | Nagai et al. | |
| 2011/0249128 A1* | 10/2011 | Squyres | G11B 27/323 |
| | | | 348/E5.042 |
| 2011/0293246 A1* | 12/2011 | Selvarajan | H04N 21/4334 |
| | | | 386/278 |
| 2011/0299835 A1 | 12/2011 | Fleming | |
| 2012/0110317 A1 | 5/2012 | Scheer et al. | |
| 2012/0213493 A1 | 8/2012 | Luo et al. | |
| 2012/0254917 A1 | 10/2012 | Burkitt et al. | |
| 2012/0300081 A1* | 11/2012 | Kim | G08B 13/19669 |
| | | | 348/143 |
| 2012/0324359 A1 | 12/2012 | Lee et al. | |
| 2013/0016213 A1* | 1/2013 | Yova | H04N 23/661 |
| | | | 348/143 |
| 2013/0036233 A1 | 2/2013 | Orleth | |
| 2013/0039634 A1 | 2/2013 | M | |
| 2013/0080895 A1 | 3/2013 | Rossman et al. | |
| 2013/0091432 A1 | 4/2013 | Shet et al. | |
| 2013/0093896 A1 | 4/2013 | Jeon | |
| 2013/0101220 A1 | 4/2013 | Bosworth et al. | |
| 2013/0117078 A1 | 5/2013 | Weik et al. | |
| 2013/0166711 A1 | 6/2013 | Wang et al. | |
| 2013/0235215 A1 | 9/2013 | Okada | |
| 2013/0262564 A1 | 10/2013 | Wall et al. | |
| 2013/0265450 A1* | 10/2013 | Barnes, Jr. | G06F 16/907 |
| | | | 348/207.1 |
| 2013/0295912 A1* | 11/2013 | Chen | H04W 4/44 |
| | | | 455/420 |
| 2013/0336590 A1 | 12/2013 | Sentinelli et al. | |
| 2014/0010517 A1 | 1/2014 | Sheffler et al. | |
| 2014/0015981 A1 | 1/2014 | Dietl | |
| 2014/0028435 A1 | 1/2014 | Brockway et al. | |
| 2014/0043480 A1 | 2/2014 | Wu | |
| 2014/0085480 A1* | 3/2014 | Saptharishi | H04N 21/23113 |
| | | | 348/159 |
| 2014/0237493 A1 | 8/2014 | Russo et al. | |
| 2014/0289189 A1 | 9/2014 | Chan et al. | |
| 2014/0289225 A1 | 9/2014 | Chan et al. | |
| 2014/0300817 A1 | 10/2014 | Bezman et al. | |
| 2014/0347478 A1* | 11/2014 | Cho | G08B 13/19656 |
| | | | 348/143 |
| 2015/0002665 A1* | 1/2015 | Sentinelli | H04N 7/188 |
| | | | 382/103 |
| 2015/0015718 A1 | 1/2015 | Fujimatsu et al. | |
| 2015/0061896 A1 | 3/2015 | Walther et al. | |
| 2015/0085184 A1 | 3/2015 | Vidal et al. | |
| 2015/0213838 A1 | 7/2015 | Dinev et al. | |
| 2015/0334299 A1* | 11/2015 | Tsuneno | H04N 23/661 |
| | | | 348/36 |
| 2015/0350538 A1 | 12/2015 | Hundemer et al. | |
| 2016/0021390 A1 | 1/2016 | Haimi-Cohen | |
| 2016/0101194 A1 | 4/2016 | Dennis | |
| 2016/0105718 A1 | 4/2016 | Xu et al. | |
| 2016/0127691 A1 | 5/2016 | Bokowski et al. | |
| 2016/0381276 A1 | 12/2016 | Li et al. | |

(56) References Cited

U.S. PATENT DOCUMENTS

| | | | |
|---|---|---|---|
| 2017/0034483 A1 | 2/2017 | Aghdasi et al. |
| 2017/0257414 A1 | 9/2017 | Zaletel |
| 2018/0286239 A1 | 10/2018 | Kaloyeros et al. |
| 2020/0265693 A1 | 8/2020 | Lindsey et al. |
| 2020/0275062 A1 | 8/2020 | Yamamoto et al. |

FOREIGN PATENT DOCUMENTS

| | | | |
|---|---|---|---|
| WO | 2009/008265 A1 | 1/2009 |
| WO | 2009/088265 A2 | 7/2009 |

OTHER PUBLICATIONS

International Search Report received for PCT Patent Application No. PCT/US15/43669, mailed on Jan. 11, 2016, 2 pages.
Park, et al., Korean Publication No. 10-2011-0023634, titled "Apparatus for generating thumbnail image and method for displaying thumbnail image", published Mar. 8, 2011, alternative translation provided for arguments in response to office action dated Sep. 27, 2018, 12 pages.

\* cited by examiner

*800*

Detect An Event   *802*

Convey Data Associated With The Event   *804*

Convey Other Data Associated With
The Event In Response To A Request   *806*

EVENT DETECTION, EVENT NOTIFICATION, DATA RETRIEVAL, AND ASSOCIATED DEVICES, SYSTEMS, AND METHODS

CROSS-REFERENCE TO RELATED APPLICATIONS

This application is a continuation of U.S. patent application Ser. No. 18/463,705, filed Sep. 8, 2023, now U.S. Pat. No. 12,014,612, issued Jun. 18, 2024, which is a continuation-in-part of U.S. patent application Ser. No. 17/897,966, filed Aug. 29, 2022, now U.S. Pat. No. 12,217,583, issued Feb. 4, 2025, which is a continuation of U.S. patent application Ser. No. 16/867,316, filed May 5, 2020, now U.S. Pat. No. 11,495,102, issued Nov. 8, 2022, which is a continuation-in-part of U.S. patent application Ser. No. 14/451,067, filed Aug. 4, 2014, now U.S. Pat. No. 10,645,459, issued May 5, 2020, the disclosure of each of which is hereby incorporated herein in its entirety by this reference.

TECHNICAL FIELD

This disclosure relates generally to surveillance systems and units and, more specifically, to event detection, event notification, data retrieval, and associated devices, units, systems, and methods.

BACKGROUND OF RELATED ART

Conventional video surveillance systems are on-premise, vendor-specific, and utilize localized digital video recorders (DVR) and/or network video recorders (NVR) with limited accessibility outside of the area in which they are positioned. As digital technology has advanced and Internet protocol (IP) cameras have become widely available, the implementation of these IP-enabled cameras into video surveillance systems has not changed. Camera systems are being implemented at an increasing rate across broad geographical areas, and the need to centralize management as well as to provide secure global access to these disparate camera systems is becoming a critical necessity.

The increased data capabilities of cellular and satellite providers make it possible to place cameras virtually anywhere in the world. However, cellular and satellite connections are metered, making it cost prohibitive to stream large amounts of data intensive video. Additionally, cellular and satellite communication links are capped to ensure bandwidth is available to all customers.

BRIEF SUMMARY

In one embodiment, a system may include a mobile surveillance unit positioned within an environment and including one or more sensors configured to detect one or more events occurring within or near the environment. The system may also include an application program configured to cause data related to a detected event of the one or more events to be transmitted to at least one device remote from the mobile surveillance unit. The application program may also be configured to cause, in response to input associated with the detected event, image data, audio data, video data, or any combination thereof, previously captured at the mobile surveillance unit and associated with the detected event to be conveyed from the mobile surveillance unit.

In another specific embodiment, a method may include detecting, via a mobile surveillance unit positioned in an environment, an event. The method may further include transmitting, from the mobile surveillance unit, data associated with the event. Also, the method may include downloading, from the mobile surveillance unit, video data associated with the event, image data associated with the event, audio data associated with the event, or any combination thereof, in response to a request associated with the transmitted data.

In other embodiments, a system may include at least one sensor at a sensor location and configured to sense an event and capture one or more videos and one or more images. The system may be configured to transmit data related to a sensed event. The system may further be configured to, in response to input associated with the transmitted data, transmit, to a server, a remote device, or both, a specific portion of the one or more videos captured at the sensor location without downloading every other portion of the one or more videos, the specific portion associated with the sensed event.

In yet another embodiment, a system may include a mobile surveillance unit positioned within an environment and including one or more sensors configured to detect one or more events occurring within or near the environment. The system may also include an application program configured to cause, responsive to a detected event, a first data set associated with the event and captured by a first sensor of the one or more sensors to be transmitted from the mobile surveillance unit. The application program may also be configured to cause, responsive to the detected event, a second, different data set associated with the event and captured by a second sensor of the one or more sensors to be transmitted from the mobile surveillance unit.

In yet another embodiment, a method may include detecting an event via a first sensor and a second sensor of a mobile surveillance unit. The method may also include transmitting, from the mobile surveillance unit, a first data set associated with the event and captured by the first sensor. Further, the method may include transmitting, from the mobile surveillance unit, a second, different data set associated with the event and captured by the second sensor.

Yet other embodiments of the present disclosure comprise computer-readable media storage storing instructions that when executed by a processor cause the processor to perform instructions in accordance with one or more embodiments described herein.

Other aspects, as well as features and advantages of various aspects, of the present disclosure will become apparent to those of skill in the art through consideration of the ensuing description, the accompanying drawings and the appended claims.

DETAILED DESCRIPTION

Referring in general to the accompanying drawings, various embodiments of the present disclosure are illustrated to show the structure and methods for recording and retrieving video with a system, such as a video surveillance system. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Figure 1:
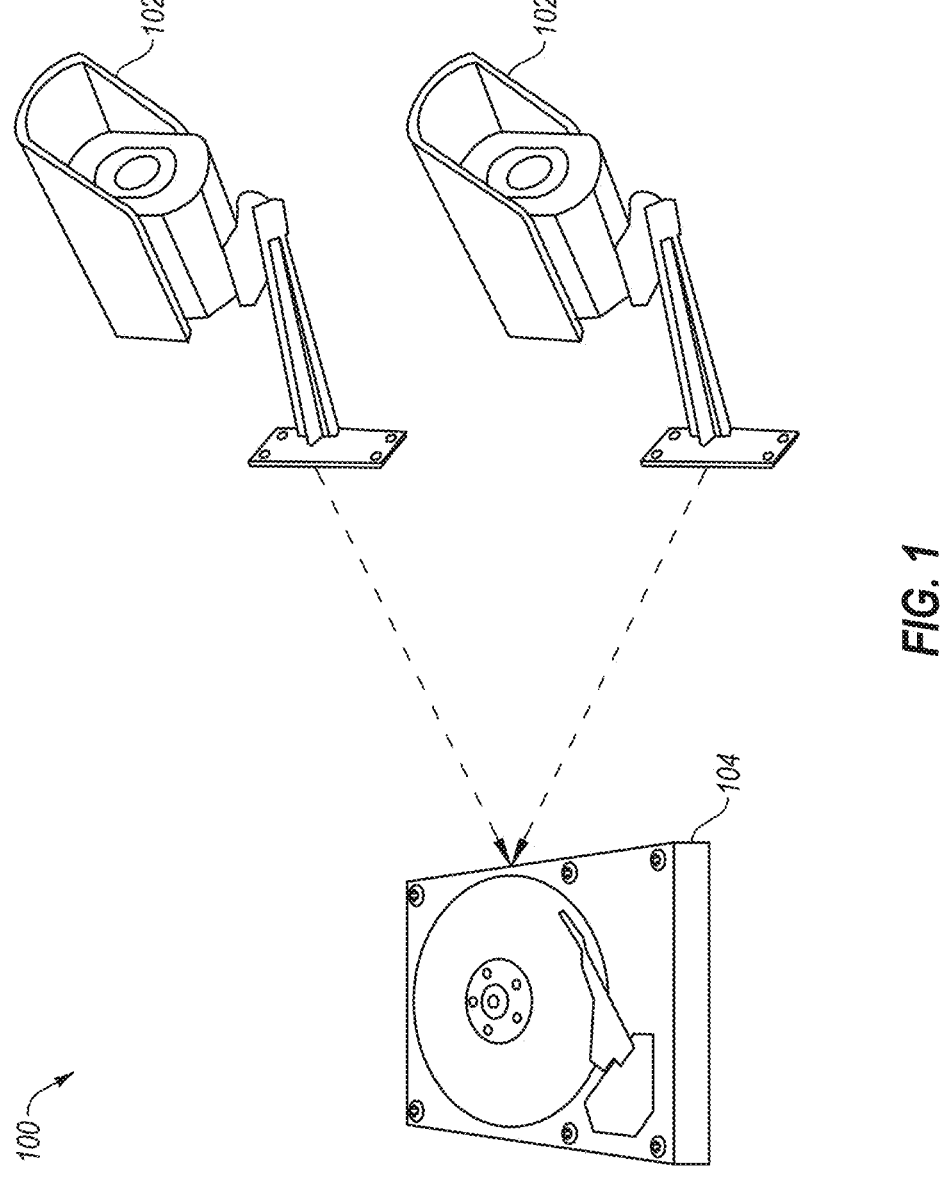
FIG. 1 depicts an onsite camera system including one or more cameras coupled to a storage device.

FIG. 1 depicts an onsite camera system 100 including one or more cameras 102 and a storage device 104, which is in the vicinity of cameras 102. Stated another way, onsite camera system 100 utilizes onsite data storage. An onsite data storage solution requires storage device 104 (i.e., either a memory card, hard drive, or a digital video recorder (DVR)/network video recorder (NVR) appliance/computer) to be onsite and connected directly to cameras 102. During operation, storage device 104 continuously records video captured by cameras 102 (i.e., 24 hours a day/7 days a week). If a remote user wants to watch any recorded video, the user must travel to onsite camera system 100 and download video footage from storage device 104. This is both time-consuming and expensive. In addition, if onsite camera system 100 is off-grid (e.g., powered by wind or solar), storage device 104 may be required to draw significant power requiring additional costly power infrastructure to be installed. If storage device 104 includes a DVR/NVR device, Internet connectivity usually does not work well because Internet enabled DVR/NVR systems are designed to be connected to broadband connections and require a large amount of bandwidth. Since broadband Internet does not exist in remote locations, remote access to Internet enabled DVR/NVRs is troublesome, if not impossible.

Figure 2:
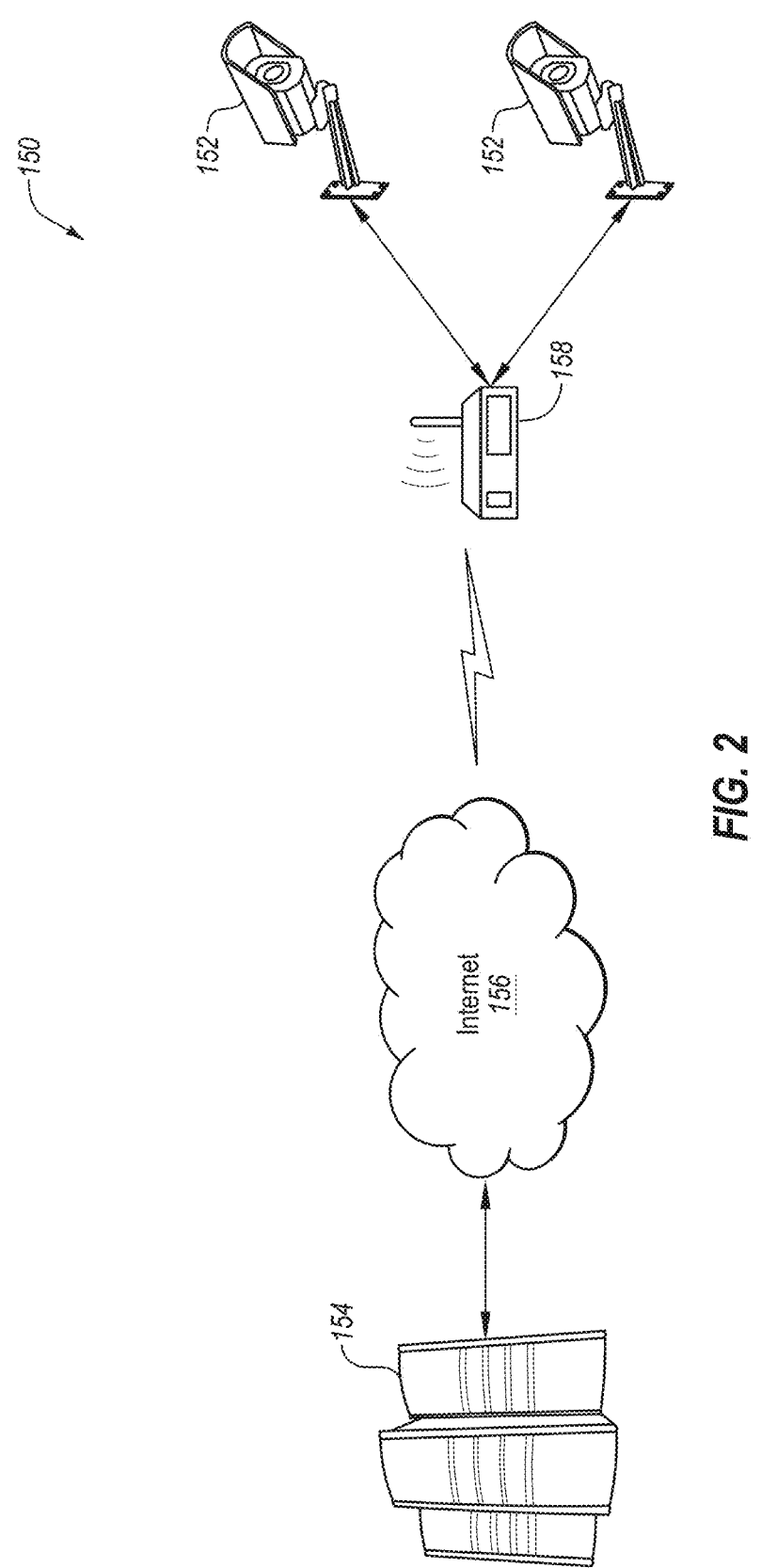
FIG. 2 illustrates a cloud-based camera system.

FIG. 2 depicts a cloud-based camera system 150 including one or more cameras 152 coupled to one or more servers 154 via the Internet 156 and a communication device 158 (i.e., a cellular or satellite modem). Some disadvantages of cloud-based camera systems are poor video quality and expensive monthly communication costs. A cloud-based camera system may require one or more cameras at a remote location to continuously stream video over a metered Internet connection (i.e., 24 hours a day/7 days a week). This constant streaming of video over an Internet connection is very expensive. Further, the bandwidth of the Internet connection is often limited resulting in poor video quality. Another problem with using a cloud-based camera system for a remote camera location is, if the Internet connection is lost, recording may also be lost.

Exemplary embodiments, as described herein, relate to a camera system configured to record video locally rather than across the Internet and provide a way for a user to access any specific portion of the recorded video in an efficient and cost-effective manner. More specifically, various embodiments relate to managing streaming video connections to cameras based on user demand, thus allowing for live video to be streamed economically over metered Internet connections (e.g., cellular and satellite) while limiting data usage (e.g., using less than 2 GB of data a month) compared to conventional solutions, which typically use an average of 32 GB of data a month. Further, embodiments of the present disclosure support configurable bit rates to allow cameras to stream live video over various connection speeds (e.g., as little as 50 Kbs connections and higher).

According to various embodiments, a system (e.g., more specifically, one or more sensors (e.g., cameras) of a system) may detect an event within or near an environment. Further, in response to detecting an event, data may be sent to a remote device (e.g., for notifying a user of the event). More specifically, for example, in response to detecting an event, an alert (e.g., a text, an email, and/or another alert) may be sent (e.g., from a sensor and/or a unit including a sensor) to a user device (e.g., user device, which may be remote from the one or more sensors) and/or a server. In some embodiments, for example, an alert may include information regarding the detected event (e.g., time, place, what was detected, unit ID, and/or any other relevant information). It is noted that, in some embodiment, meta data (e.g., text-based information about an event) may be sent to a user device (e.g., in response to an event). Further, in some embodiments, audio data captured by one or more sensors may be sent to a user device (e.g., in response to an event). Further, in response to a request (e.g., a user request, an artificial intelligence (AI) request, a system request, or any other request), additional data (e.g., image, video, and/or audio data) regarding the event may conveyed (e.g., transmitted, downloaded, retrieved, etc.) (e.g., from the unit to a server and/or electronic device).

According to various embodiments, a user may select one of a number of operating modes. In one operating mode wherein a user (e.g., a customer, an administrator, and/or a monitoring entity) is actively monitoring an environment, images, video, and/or other data captured in or near the environment may be conveyed (e.g., transmitted, uploaded, retrieved, etc.) to the user and/or to a server (e.g., periodically and/or in response to an event). In another mode wherein a user (e.g., a customer) is not actively monitoring an environment, an alert (e.g., a text alert) may be conveyed (e.g., transmitted, uploaded, retrieved, etc.) to the user and/or to a server (e.g., in response to an event). In response to receipt of an alert, the user may, for example, request additional data (e.g., images, audio, and/or video) regarding the event and/or take other action.

Further, in some embodiments wherein a unit (e.g., a mobile surveillance unit) includes multiple sensors (e.g., multiple cameras), upon detection of an event, different data sets (i.e., captured by different sensors) may be transmitted (e.g., to a user device and/or a server). More specifically, upon detection of an event, a first data set associated with a first sensor may be transmitted (e.g., to a remote server and/or a user device), and at least a second, different data set associated with at least a second sensor may be transmitted (e.g., to the remote server and/or the user device). Enabling different sensors to send different data types/sets may reduce data usage (e.g., cellular data usage) (i.e., an amount of data transmitted), as compared to, for example, embodiments wherein image and/or video data is sent from each camera of a surveillance unit in response to a detected event.

As an example wherein a surveillance unit includes a plurality of sensors, in response to an event, text data regarding the event may be transmitted (e.g., to a remote server and/or a user device) from the surveillance unit. Further, additional data (e.g., text, images, and/or video) regarding the event may be transmitted from one or more of the plurality of sensors (e.g., to a remote server and/or a user device).

As yet another example, in response to an event, video data, and possibly image data, captured via one of the plurality of cameras may be transmitted (e.g., to a remote server and/or a user device), and image data (but not video data) captured via each of the other cameras of the plurality of cameras may be transmitted (e.g., to a remote server and/or a user device).

Figure 3A:
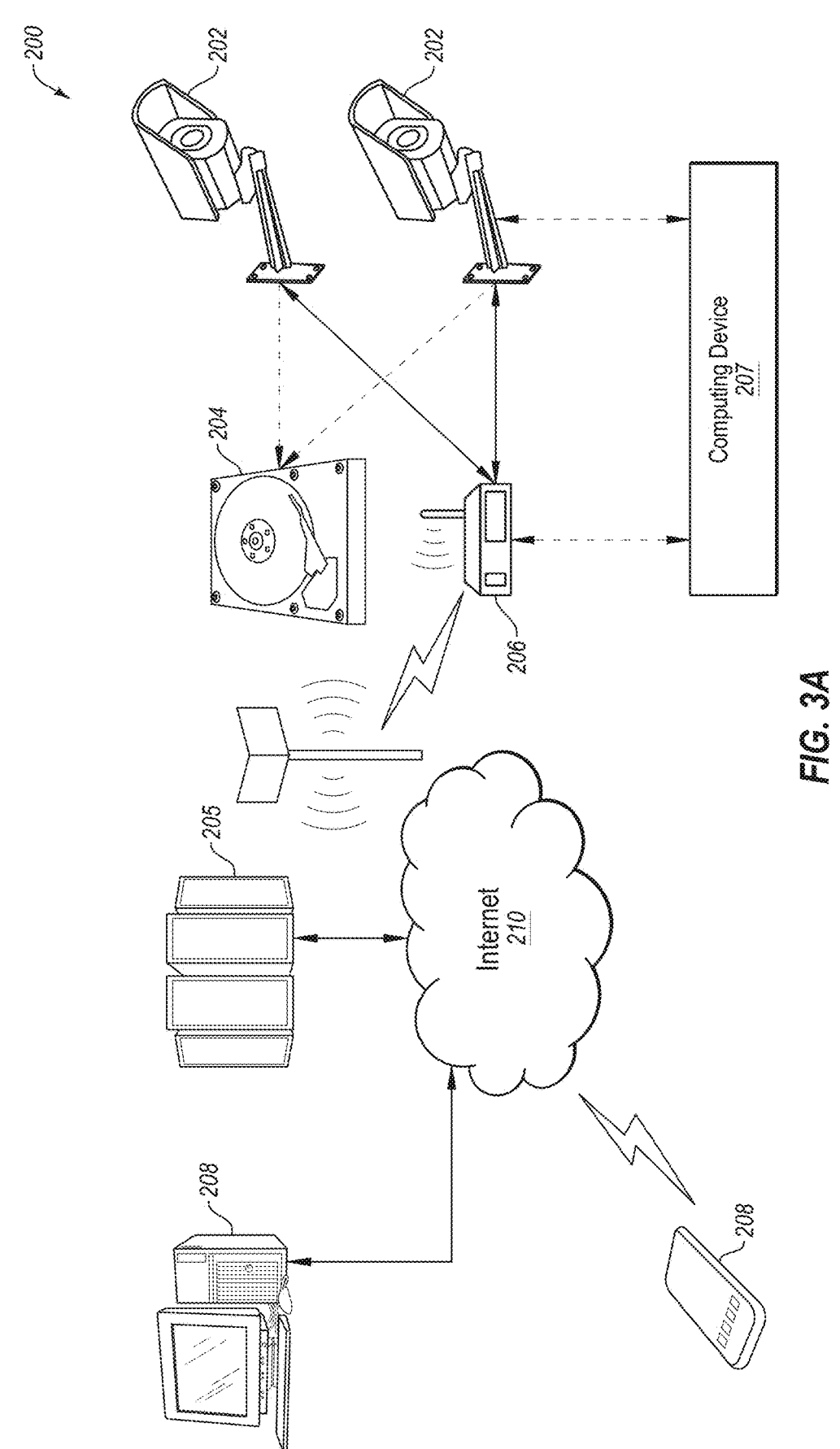
FIG. 3A depicts a system, according to an embodiment of the present disclosure.

FIG. 3A depicts a system 200 in accordance with an embodiment of the present disclosure. System 200, which may also be referred to as a "video camera system," includes one or more cameras 202, each of which being communicatively coupled to one or more local storage devices 204. Local storage device 204, which may comprise, for example only, internal flash media, a network attached storage device, or any other suitable electronic storage device, may be configured for receiving and storing data (e.g., video, images, and/or i-frames) captured by camera 202. As will be understood by a person having ordinary skill in the art, an amount of time that can be recorded by local storage device 204 may be a function of a size of the memory of local storage device 204 and the bitrate (quality and frame-rate) at which the recording is saved. It is noted that storage device 204, and a recording format and encoding performed by local storage device 204, may be dependent on the type of camera 202. Local storage device 204 may include a finite amount of memory; thus, according to one embodiment, video recording may be handled as first in first out (FIFO) and the oldest recordings may be overwritten when memory of local storage device 204 is full.

As will be appreciated, some cameras, such as cameras made by Axis Communications AB of Lund, Sweden, Bosch Security Systems, Inc. of New York, USA, and other camera manufacturers, may be configured for hardware-based event generation (i.e., to generate events in response to sensor data). Accordingly, in some embodiments, cameras 202, in response to captured data, may generate one or more events (e.g., via hardware-based event generation).

It is noted that an event may be detected and/or processed via a sensor (e.g., a camera) and/or via additional functionality (e.g., software and/or hardware) external to the sensor. More specifically, event detection, as described herein, may be enabled via analytics running on a sensor (e.g., a camera) and/or analytics running on another processor (e.g., within a unit and/or a server (e.g., cloud server)).

In some embodiments, cameras 202, storage device 204, communication device 206, and computing device 207 may be part of a unit, such as a surveillance/security unit. As a more specific example, cameras 202, storage device 204, communication device 206, and computing device 207 may be part of a mobile unit (e.g., a mobile surveillance/security unit), which may include a portable trailer and a mast, wherein one end of the mast is coupled to a base of the portable trailer. Another end of the mast may be coupled to a head unit, which may include (or be coupled to) for example, one or more batteries, one or more cameras (e.g., including cameras 202), one or more lights, one or more speakers, one or more microphones, and/or other input and/or output devices. For example, a mobile unit may be positioned in or near an environment (e.g., a parking lot, a roadside location, a construction zone, a concert venue, a sporting venue, a school campus, without limitation) to detect events in or near the environment.

System 200 may further include one or more electronic devices 208, which may comprise, for example only, a mobile device (e.g., mobile phone, tablet, etc.), a desktop computer, or any other suitable electronic device including a display. Electronic device 208 may be accessible to one or more end-users. A communication device (e.g., a modem) 206, which may comprise any suitable and known communication device, may be coupled to local storage device 204, and possibly cameras 202, via wired connections, wireless connections, or a combination thereof. Communication device 206 may further be coupled to electronic devices 208 via the Internet 210. System 200 may further include a server 205 (e.g., a cloud server), which is remote from cameras 202 and which is communicatively coupled to each electronic device 208 and each communication device 206. According to various embodiments of the present disclosure, camera 202, local storage device 204, computing device 207, and communication device 206 may be within a first location (a "camera location"), and server 205 may be within a second location, remote from the camera location. In addition, each electronic device 208 may be remote from the camera location and server 205. As will be appreciated by a person having ordinary skill in the art, system 200 is modular, expandable, and scalable.

Figure 3B:
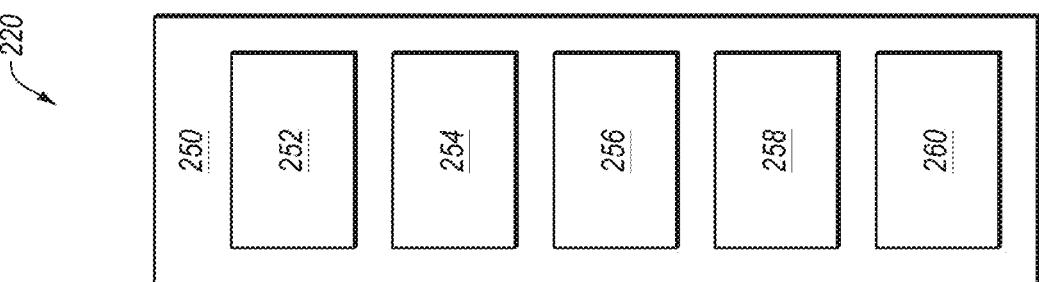
FIG. 3B depicts another system, in accordance with various embodiments of the present disclosure.
Figure 3B:
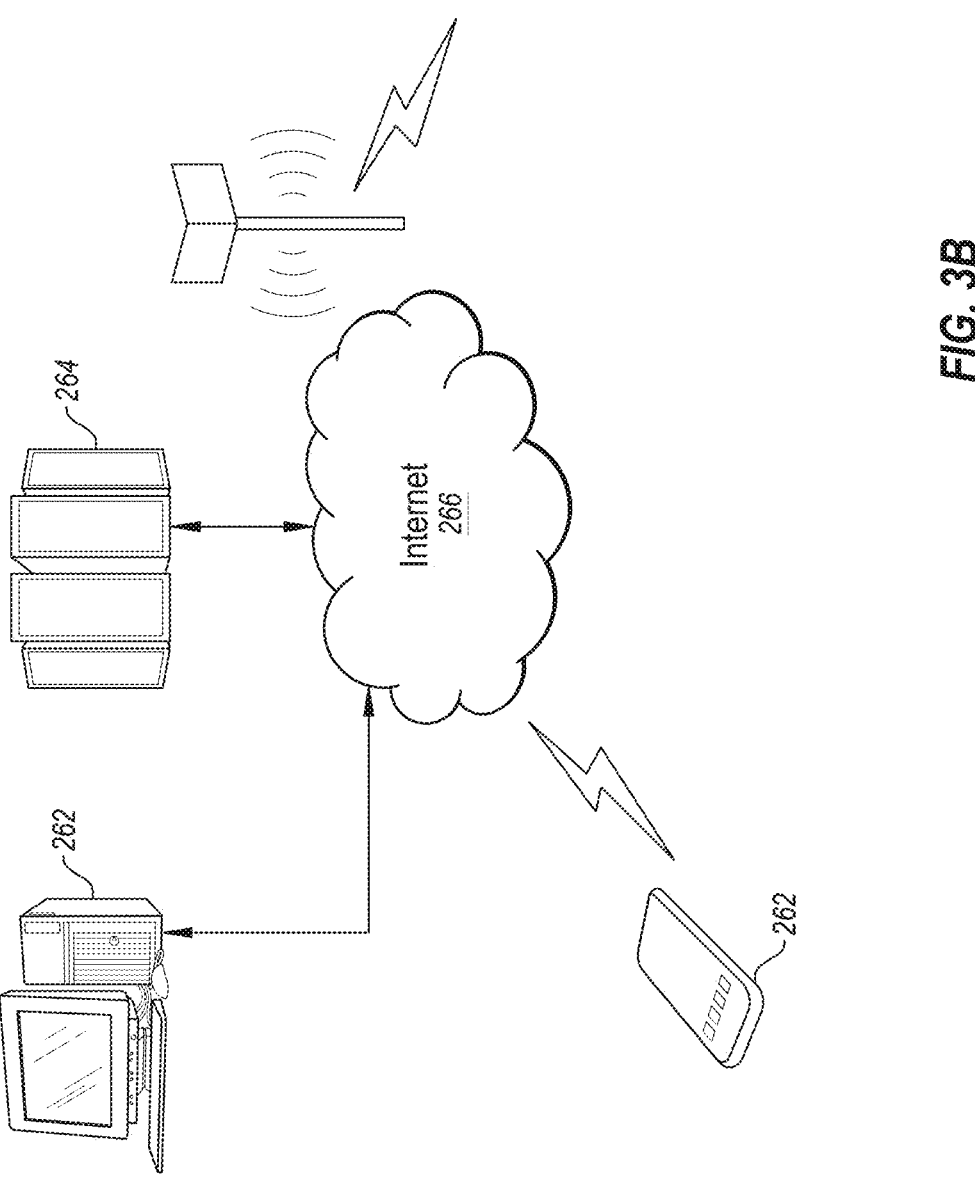

FIG. 3B illustrates an example system 220, according to one or more embodiments of the disclosure. For example, system 220 may include system 200 of FIG. 3A. System 220, which may include a security and/or surveillance system, includes a unit 250, which may also be referred to herein as a "mobile unit," a "mobile security unit," a "mobile surveillance unit," a "physical unit," or some variation thereof.

According to various embodiments, unit 250 may also include one or more sensors 252 (e.g., cameras, weather sensors, motion sensors, noise sensors, chemical sensors, RF sensors (e.g., radar or cell phone MAC address sniffer (e.g., to sense a cell phone or other device)), microphones, without limitation) and one or more output devices 254 (e.g., lights, speakers, electronic displays, without limitation). For example only, sensors 252 may include one or more cameras (e.g., cameras 202 of FIG. 3A), such as thermal cameras, infrared cameras, optical cameras, PTZ cameras, bi-spectrum cameras, any other camera, or any combination thereof. Further, for example only, output devices 254 may include one or more lights (e.g., flood lights, strobe lights (e.g., LED strobe lights), and/or other lights), one or more speakers (e.g., two-way public address (PA) speaker systems), any other suitable output device (e.g., a digital display), or any combination thereof.

In some embodiments, unit 250 may also include one or more storage devices 256 (e.g., storage device 204 of FIG.

3A). Storage device 256, which may include any suitable storage device (e.g., a memory card, hard drive, a digital video recorder (DVR)/network video recorder (NVR), internal flash media, a network attached storage device, or any other suitable electronic storage device), may be configured for receiving and storing data (e.g., video, images, and/or i-frames) captured by sensors 252. In some embodiments, during operation of unit 250, storage device 256 may continuously record data (e.g., video, images, i-frames, and/or other data) captured by one or more sensors 252 (e.g., cameras, lidar, radar, environmental sensors, acoustic sensors, without limitation) of unit 250 (e.g., 24 hours a day, 7 days a week, or any other time scenario).

Unit 250 may further include a computer 258 (e.g., computing device 207 of FIG. 3A), which may include memory and/or any suitable processor, controller, logic, and/or other processor-based device known in the art. Moreover, although not shown in FIG. 3B, unit 250 may include one or more additional devices including, but not limited to, one or more microphones, one or more solar panels, one or more generators (e.g., fuel cell generators), or any combination thereof. Unit 250 may also include a communication device (e.g., a modem (e.g., a cellular modem, a satellite modem, a Wi-Fi modem, etc.)) 260 (e.g., device 206 of FIG. 3A), which may comprise any suitable and known communication device, which may be coupled to sensors 252, output devices 254, storage device 256, and/or computer 258 via wired connections, wireless connections, or a combination thereof. In some embodiments, communication device 260 may include one or more radios and/or one or more antennas.

System 220 may further include one or more electronic devices 262 (e.g., electronic devices 208 of FIG. 3A), which may comprise, for example only, a mobile device (e.g., mobile phone, tablet, etc.), a desktop computer, or any other suitable electronic device including a display. Electronic device 262 may be accessible to one or more end-users. Additionally, system 220 may include a server 264 (e.g., a cloud server) (e.g., server 205 of FIG. 3A), which may be remote from unit 250. Communication device 260, electronic devices 262, and server 264 may be coupled to one another via the Internet 266.

According to various embodiments of the disclosure, unit 250 may be within a first location (a "camera location" or a "unit location"), and server 264 may be within a second location, remote from the first location. In addition, each electronic device 262 may or may not be remote from unit 250 and/or server 264. As will be appreciated by a person having ordinary skill in the art, system 220 may be modular, expandable, and/or scalable.

As noted above, in some embodiments, unit 250 may include a mobile unit (e.g., a mobile security/surveillance unit). In these and other embodiments, unit 250 may include a portable trailer (not shown in FIG. 3B; see FIG. 3C), a storage box (e.g., including one or more batteries) (not shown in FIG. 3B; see FIG. 3C), and a mast (not shown in FIG. 3B; see FIG. 3C) coupled to a head unit (e.g., including, for example, one or more cameras, one or more lights, one or more speakers, and/or one or more microphones) (not shown in FIG. 3B; see FIG. 3C). According to various examples, in addition to sensors and output devices, a head unit of unit 250 may include and/or be coupled to storage device 256, computer 258, and/or communication device 260.

Figure 3C:
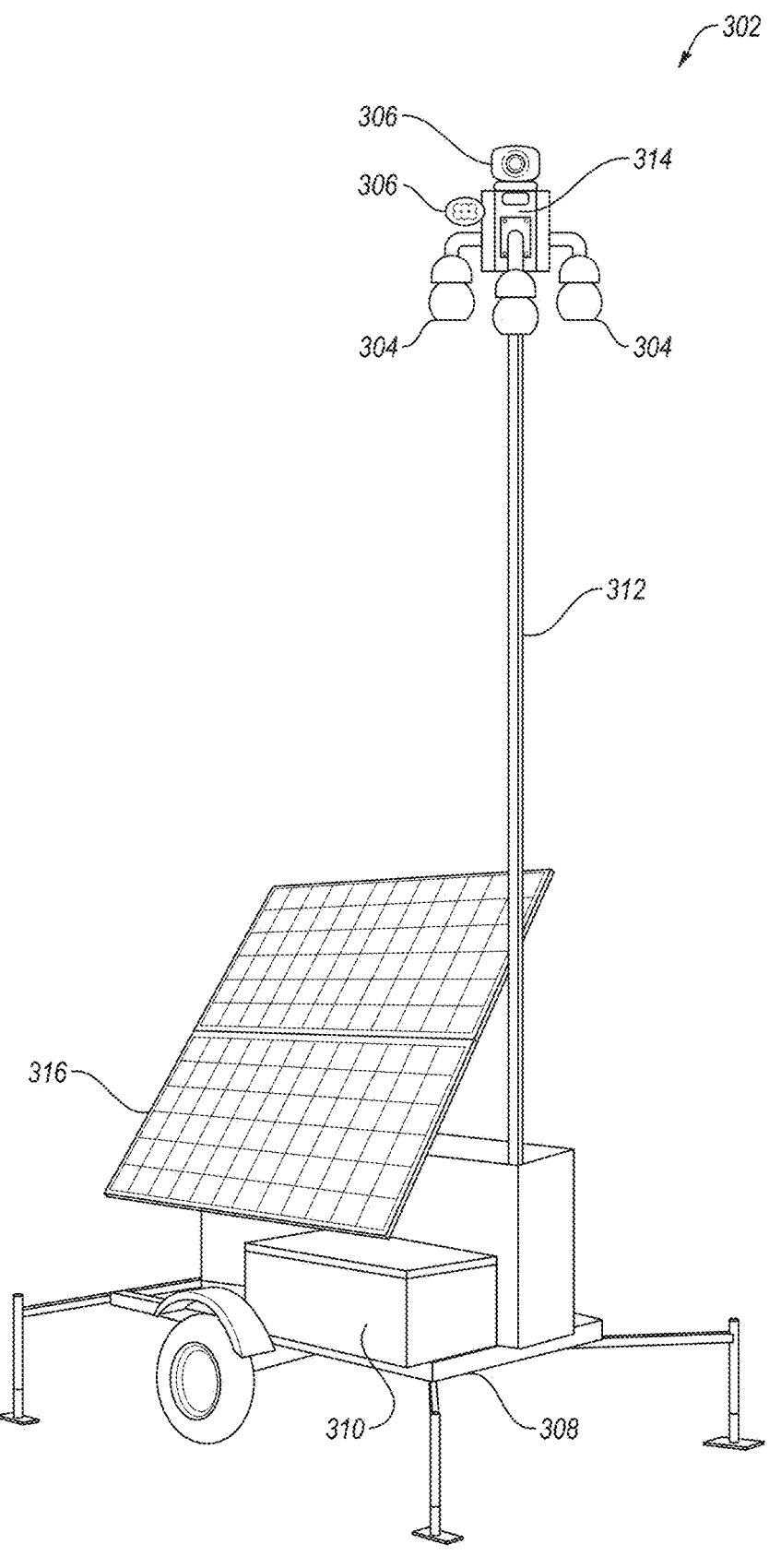
FIG. 3C depicts an example system including a mobile unit, in accordance with various embodiments of the present disclosure.

FIG. 3C depicts a unit 302, in accordance with various embodiments of the disclosure. For example, unit 302 may include unit 250 of FIG. 3B. Unit 302, which may also be referred to herein as a "mobile unit," a "mobile security unit," a "mobile surveillance unit," or a "physical unit," may be configured to be positioned in an environment (e.g., a parking lot, a roadside location, a construction zone, a concert venue, a sporting venue, a school campus, without limitation). In some embodiments, unit 302 may include one or more sensors (e.g., cameras, weather sensors, motion sensors, RF sensors, audio sensors, without limitation) 304 and one or more output devices 306 (e.g., lights, speakers, electronic displays, without limitation). Unit 302 may also include at least one storage device (e.g., internal flash media, a network attached storage device, or any other suitable electronic storage device), which may be configured for receiving and storing data (e.g., video, images, audio, without limitation) captured by one or more sensors of unit 302.

In some embodiments, unit 302 may include a mobile unit. In these and other embodiments, unit 302 may include a portable trailer 308, a storage box 310, and a mast 312 coupled to a head unit (also referred to herein as a "live unit," an "edge device," or simply an "edge") 314, which may include (or be coupled to) for example, one or more batteries, one or more cameras, one or more lights, one or more speakers, one or more microphones, and/or other input and/or output devices. According to some embodiments, a first end of mast 312 may be proximate storage box 310 and a second, opposite end of mast 312 may be proximate, and possibly adjacent, head unit 314. More specifically, in some embodiments, head unit 314 may be coupled to mast 312 at an end that is opposite an end of mast 312 proximate storage box 310.

In some examples, unit 302 may include one or more primary batteries (e.g., within storage box 310) and one or more secondary batteries (e.g., within head unit 314). In these embodiments, a primary battery positioned in storage box 310 may be coupled to a load and/or a secondary battery positioned within head unit 314 via, for example, a cord reel.

In some embodiments, unit 302 may also include one or more solar panels 316, which may provide power to one or more batteries of unit 302. More specifically, according to some embodiments, one or more solar panels 316 may provide power to a primary battery within storage box 310. Although not illustrated in FIG. 3C, unit 302 may include one or more other power sources, such as one or more generators (e.g., fuel cell generators) (e.g., in addition to or instead of solar panels).

Figure 4:
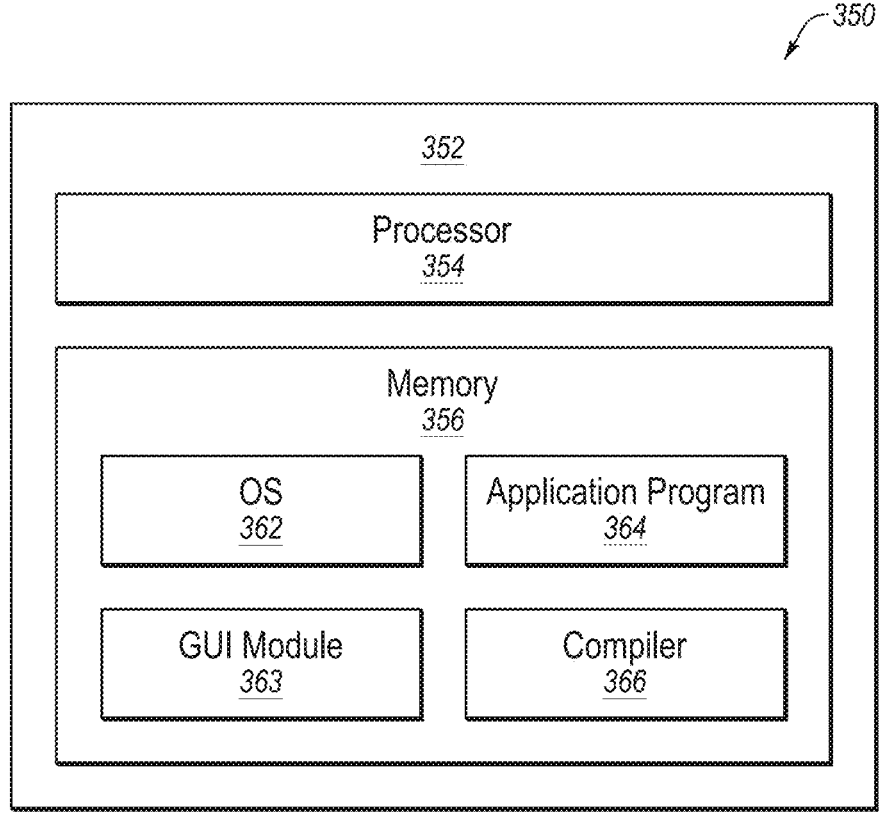
FIG. 4 is a block diagram of a system for implementing various embodiments of the present disclosure.

FIG. 4 illustrates a system 350 that may be used to implement embodiments of the present disclosure. System 350 may include a computer 352 that comprises a processor 354 and memory 356. For example only, and not by way of limitation, computer 352 may comprise a workstation, a laptop, or a hand-held device such as a cell phone or a personal digital assistant (PDA), a server (e.g., server 205) or any other processor-based device known in the art. In one embodiment, computer 352 may be operably coupled to a display (not shown in FIG. 4), which presents images to the user via a GUI.

Generally, computer 352 may operate under control of an operating system 362 stored in the memory 356, and interface with a user to accept inputs and commands and to present outputs through a GUI module 363. Although GUI module 363 is depicted as a separate module, the instructions performing the GUI functions may be resident or distributed in the operating system 362, an application program 364, or implemented with special purpose memory and processors. Computer 352 may also implement a compiler 366 that allows application program 364 written in a programming language to be translated into processor 354 readable code. After completion, application program 364 may access and manipulate data stored in the memory 356 of the computer 352 using the relationships and logic that are generated using the compiler 366.

Further, operating system 362 and application program 364 may include instructions that, when read and executed by the computer 352, may cause the computer 352 to perform the steps necessary to implement and/or use embodiments of the present disclosure. Application program 364 and/or operating instructions may also be tangibly embodied in memory 356 and/or data communications devices, thereby making a computer program product or article of manufacture according to an embodiment of the present disclosure. As such, the term "application program" as used herein is intended to encompass a computer program accessible from any computer readable device or media. Application program 364 may exist on computing device 207, an electronic device (e.g., electronic device 208; see FIG. 3), and/or a server (e.g., server 205; see FIG. 3). Furthermore, portions of application program 364 may be distributed such that some of application program 364 may be included on a computer readable media within an electronic device (e.g., electronic device 208) and some of application program 364 may be included on a server (e.g., server 205). In other embodiments, application program 364 may be configured to run on electronic device 208, server 205, storage device 204, communication device 206, another computing device 207 (see FIG. 3), or any combination thereof. As a specific example, application program 364 may exist on server 205 and may be accessible to an end-user via an electronic device 208.

With reference to FIGS. 3A-5, a contemplated operation of system 200 will now be described. During operation, camera 202 may be configured to capture and convey video to local storage device 204 continuously, or according to either a defined schedule or an event, such as motion being detected and/or a sensor being activated. It is noted that video stored on local storage device 204 may be stored a different bitrate (e.g., usually higher) than live video streaming bitrates over Internet 210 through relay server 205 and on to electronic device 208. Further, camera 202 may be configured to periodically capture and convey a snapshot image and/or an i-frame to server 205, which may be configured for storing one or more time-stamped snapshot images and/or i-frames. Alternatively, server 205 may be configured to capture and retrieve data (e.g., a snapshot image and/or an i-frame) from camera 202.

Moreover, in some embodiments, in response to detecting an event (e.g., detecting a human, a vehicle, an animal, and/or other object), data (e.g., text data) may be transmitted (e.g., from camera 202 and/or computing device 207) to a device (e.g., server 205 and/or electronic device 208) to alert, for example, a user (e.g., end-user, surveillance user, etc.) about the event. For example, the data may include a text, email, and/or an application notification (e.g., a push alert) including a basic alert (e.g., "event detected") or a more specific alert (e.g., "human detected"). More sophisticated alerts may also be within the scope of the disclosure (e.g., "trespasser detected," "human with a blue shirt," "gray truck detected," "human trespassing,") or some other alert (e.g., including audible and/or visible elements). The data may further include information regarding timing and/or location of the event (e.g., "trespasser detected; 2:30 AM, 1825 South State Street, human with blue shirt").

In embodiments including alerts, a user may interact with electronic device 208 and more specifically, a user interface (e.g., a graphical user interface (GUI)) of electronic device

208 that displays data (e.g., alerts or other data) and allows the user to request video, audio, and/or images to be conveyed (e.g., uploaded, downloaded, transmitted, retrieved, etc.) from local storage device 204 by selecting the alert and/or a date and time range.

It is noted that, in some non-limiting examples, a request or input associated with (e.g., provided or generated in response to) the data (e.g., the data transmitted in response to an event or otherwise), may be user generated, AI generated, system generated (e.g., generated by system 200), generated/provided otherwise, or any combination thereof.

Further, in some embodiments, a user may access server 205 and view the data (e.g., an alert, one or more time-stamped snapshot images, and/or one or more i-frames). The data (e.g., an alert, time-stamped snapshot images, and/or i-frames) may be used by the user in deciding a date and time range of interest for viewing one or more videos. More specifically, a user may interact with electronic device 208 and more specifically, a user interface (e.g., a graphical user interface (GUI)) of electronic device 208 that displays data (e.g., an alert, a previously saved time-stamped images, and/or i-fames) and allows the user to request video to be conveyed (e.g., uploaded, downloaded, transmitted, retrieved, etc.) from local storage device 204 by selecting a date and time range. Accordingly, system 200 may provide an end-user with access to data (e.g., alerts and both still images, i-frames, as well as to archived video footage). The end-user may select a day and an approximate time, and application program 364 can access and display all data (e.g., alerts, preset images and/or i-frames). Further, an end-user, from any computer and any location, can select, via application program 364, an alert and/or one or more images to access archived video footage from any computer and any location.

In at least some embodiments, (e.g., instead of sending pictures to server 205), one or more i-frames at the nearest date and time of interest may be sent (e.g., in real-time) from camera 202 to server 205 and/or electronic device 208 to provide more granular visibility of what might be recorded. In other words, sending discreet frames (e.g., instead of pictures) to help users find content of interest by moving a selection component (e.g., a slider) that shows frames closest to that time. This may provide a way to scrub video using limited data while providing what looks like the video stored in server 205.

In one contemplated operation, a user may request a video clip that includes a portion of a video clip that was already downloaded from a previous request. In this case, to reduce data consumption, at least a portion of the previously downloaded video clip may be used. Further, in some embodiments, the previously downloaded video clip may be combined with a newly downloaded video clip to fulfill the end-users video clip request. In other words, cache portions of video that were previously downloaded may be used with new portions (i.e., recently downloaded clips) of video that overlap with that the time frame identified by the user. Further, it is noted that a user request does not necessarily need to be a date/time stamp generated request. Rather, for example, a request may include an offset of a time or frame number. Any data to indicate date/time region may be used to identify and/or retrieve video.

As will be appreciated, in embodiments wherein alerts (e.g., text alerts) are sent from a camera location (e.g., to a user and/or server 205) (e.g., in response to a detected event), data consumption (e.g., cellular data consumption) may be decreased relative to embodiments wherein images and/or video are conveyed (e.g., periodically and/or in response to a detected event) from a camera location (e.g., to server 205).

Figure 5:
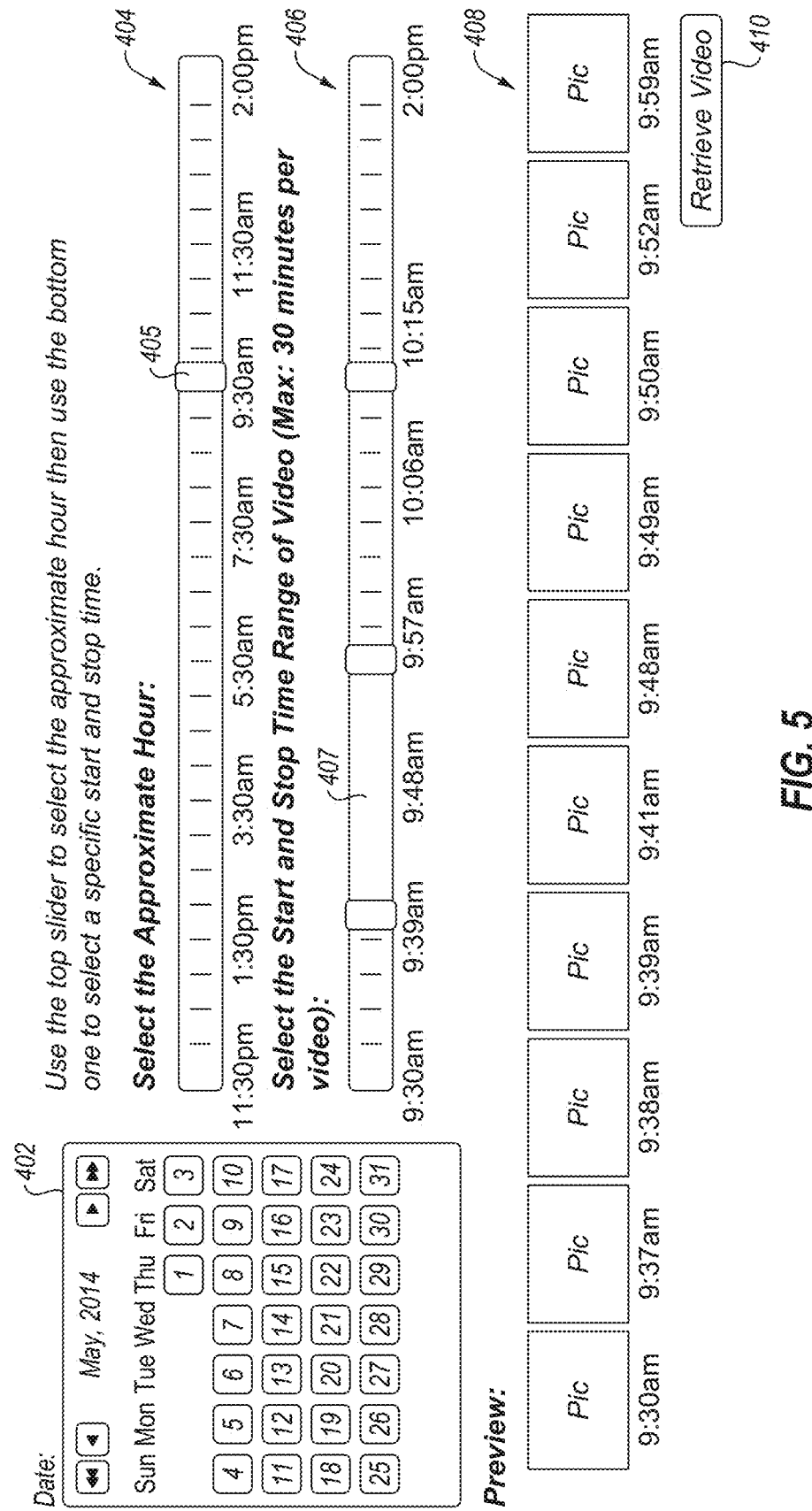
FIG. 5 is a screenshot illustrating a graphical user interface (GUI) generated by an application program, in accordance with an embodiment of the present disclosure.

FIG. 5 is a screenshot 400 illustrating a graphical user interface (GUI) configured for displaying saved, time-stamped images. The images may enable a user to request video to be conveyed (e.g., uploaded, downloaded, transmitted, retrieved, etc.) by selecting a date and, possibly, a time range. More specifically, as illustrated, the GUI includes a calendar display 402 for selecting a desired month and day. Further, the GUI includes a scale 404 and a selection component (e.g., a slider) 405 for selecting an approximate hour and a scale 406 and selection component for selecting a specific start and stop time of the selected hour. In addition, the GUI includes a plurality of images 408, which are labeled as being captured at specific times between the start and stop times selected by selection component 407. The GUI further includes an icon 410, which, upon selection by a user, may cause a video associated with a selected image and/or a date/time range to be downloaded. Based on a video request made by a user, application program 364 may communicate with camera 202 and/or storage device 204 and may search for and download all videos on camera 202 and/or storage device 204 from within the specified date/time range from local storage device 204 to a server (e.g., server 205). Application program 364 may communicate with camera 202 and/or storage device 204 via, for example, standard protocols, such as HTTP, FTP, SSH, and Telnet, or a device specific application programming interface (API). Each camera 202 or storage device 204 may be different, thus, according to one embodiment, an abstraction layer for communication may be used to allow application program 364 to communicate with each type of camera or storage device.

It is noted that if the application program 364 identifies two or more video clips (i.e., within the specified date/time range), application program 364 may be configured to merge the clips into one continuous clip. Further, application program 364 may also convert the video clip to a video clip (e.g., an internet standard video clip) compatible with all suitable devices, operating systems, and browsers. After a video has been retrieved and processed, application program 364 may publish the video for the end-user to download and notify the end-user when the video is accessible. The retrieved video can be stored in the cloud (e.g., within server 205) for multiple users to view simultaneously and/or can be delivered electronically (e.g., email, SMS/text, and/or ftp the video to a designated server, etc.) to one or more end-users.

It is noted that all pan, tilt, and zoom (PTZ) presets of camera 202 may be controlled via system 200, making it possible for cameras 202 to have a virtually unlimited number of presets that can be managed by any number of authorized end-users without giving explicit access to cameras 202. System 200, and more specifically application program 364, may be configured to store information regarding each camera 202 (e.g., type, location, etc.) and enable users to select cameras from a master list or by a geographical location. Once a user selects a camera, the user may access and control the camera (e.g., pan, tilt, and zoom functionalities) via an electronic device 208 (e.g., any computer or smartphone) and application program 364. Additionally, a user may configure a camera according to one or more presets (e.g., via a preset camera management tool). Further, a user can create new presets that may become a database for archived images. Thus, a camera may operate according to an end-user's presets and capture snapshot images at desired intervals. Additionally, an end-user may manage time-lapse and other archiving functions directly from a preset camera management tool.

System 200 may further be configured for performing user authentication, security, and management features, making it possible for an end-user to manage world-wide networks of, for example, thousands of cameras. System 200 may also include a virtual security barrier between users and cameras 202, ensuring an unprecedented level of security (e.g., security suitable for the highest level of government security).

As will be appreciated, system 200 is hardware agnostic, and, thus, may be compatible with most, if not all, cameras (e.g., IP cameras and CCTV cameras with encoders), network connectivity solutions (e.g., broadband, cellular, satellite, Wi-Fi, etc.), and network topologies (e.g., public, private, private on VPN, etc.). In addition, embodiments of the present disclosure may utilize industry standard compression and transport technologies to ensure compatibility with current and future camera technologies. Further, because system 200 is hardware agnostic and provides a camera management layer to all cameras system-wide, camera hardware that fails can be easily and quickly replaced with the same camera model or different hardware or manufacturer or model, all the while the end-user has the exact same experience viewing and operating the camera. It is noted that system 200 may be configured to convey data (i.e., from one or more cameras 202) to any suitable device anywhere in the world, regardless of the original camera manufacturers supported specifications. This may provide users with an unprecedented level of access to their cameras regardless of where they are or what device they may be using at the time. Further, because system 200 may be compatible with all known and suitable cameras, an end-user's hardware investments may be protected for an extended period beyond support.

In addition, system 200 may include an added layer of system analytics to users (e.g., customers) providing critical real-time data and reports such as user activity including date/time, IP address, device, OS, stream duration, camera control history, camera viewing history, login and logout, as well as number of concurrent viewers per camera, camera up time, system health, etc. According to other embodiments, system 200 may be configured to provide geo-location capabilities for cameras 202, making it possible to map an end-user's camera locations, as well as provide real-time automatic vehicle location (AVL) for live streaming video from mobile units, such as mobile cars, trucks, and/or living beings with cameras. This includes the unique ability to map "bread crumb" images on maps showing precise locations (including pictures) where cameras have been with date/time stamps.

Although the various embodiments have been described with reference to camera systems, the present disclosure is not so limited. Rather, system 200 may include one or more sensors and/or control devices, integrating additional data and control capabilities to camera locations making it easy for users to get additional information and to control other systems from a single interface.

According to one embodiment, application program 364 may include, or may be compatible with, a development (API), which may enable customers to integrate their video camera streams into their own website, without the need to constantly update the website if camera hardware changes, network topologies change, etc., and without worrying about the amount of user load (simultaneous viewers) they will experience.

System 200 may be implemented with industry standard security protocols, and employ measures to ensure secure streaming video portals. By way of example, system 200 may be configured to require user authentication before access is permitted and users may be assigned specific roles (i.e., permissions) within system 200, which allows the user to access and perform specific camera and system operations. User permissions may include functionality relating to viewing camera stream, viewing camera archives, controlling camera presets, controlling camera pan/tilt/zoom/focus features, suspending camera patrol, and managing camera presets. Further, permissions may be granted according to various permission levels. As one example, a user with "administrator user" permissions can create, edit, view, and delete users under their domain. The user can also change user permissions, camera access rights, reset passwords, and access full analytics.

System 200 may provide a user with full administration capability. Thus, a user may manage who has access to one or more cameras, when they have access, and how they have access, including user roles, camera access rights, and password.

System 200 may further utilize industry standard encryption techniques. For example, user access to system 200 may be performed over HTTPS (256-bit SSL encryption), and industry standard encryption may be used to encrypt video/audio streams between cameras and video transcoders and relay servers. Further, industry standard encryption may be used to encrypt video and audio streams between video transcoders and relay servers and to an end-user. Because system 200 may obfuscate the camera, sensor, and data acquisition hardware from the end-user, "hacking" is virtually eliminated because all network assets can be on private (non-public accessible) networks.

Figure 6:
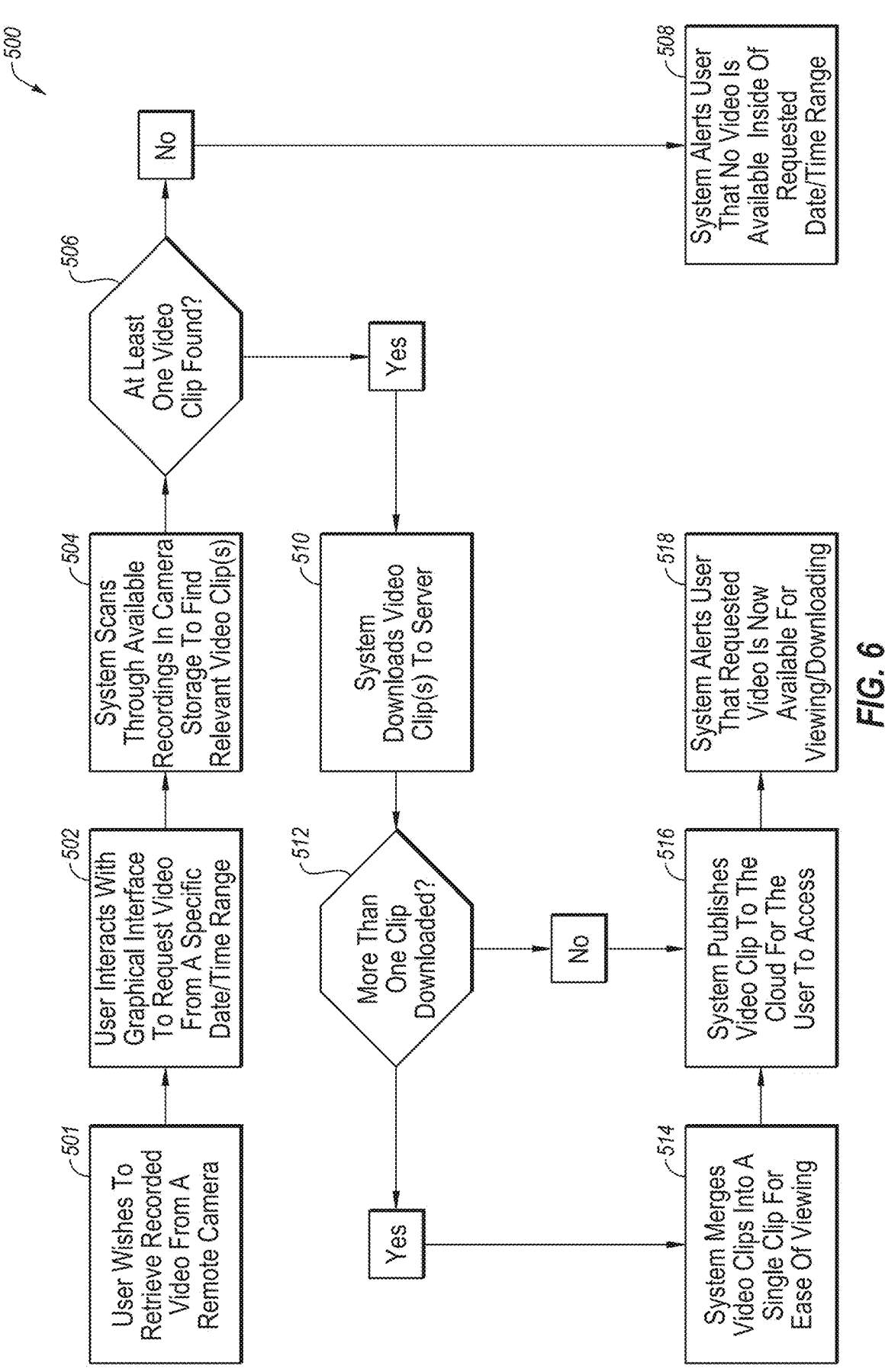
FIG. 6 is a flowchart illustrating a method, according to an embodiment of the present disclosure.

FIG. 6 is a flowchart illustrating a method 500, in accordance with an embodiment of the present disclosure. With reference to FIGS. 3-6, method 500 will now be described. Initially, a user (i.e., after determining to retrieve data (depicted by act 501)), may select a date, and possibly, a time range (depicted by act 502). Further, the user may interact with a GUI to request a video from the selected date and time range (depicted by act 502). In response to a video request, application program 364 may scan through available recordings (i.e., in camera 202 and/or storage device 204) to locate one or more relevant video clips (depicted by act 504). It may then be determined whether at least one video clip is located (depicted by act 506). If no video clips are located, the user may be notified that no video clips exist for the selected date and time range (depicted by act 508). If at least one video clip is located, the at least one video clip may be conveyed (e.g., uploaded, downloaded, transmitted, retrieved, etc.) to server 205 (depicted by act 510). Moreover, it may be determined if more than one video clip is downloaded (depicted by act 512). If so, the video clips may be merged into a single clip (depicted by act 514) and method may continue to act 516, which includes publishing the single clip for viewing by a user. If only one video clip is downloaded, the video clip may be published for the user to access (depicted by act 516). Furthermore, in act 518, an alert may be provided to the user indicating that the video clip is available for viewing.

Figure 7:
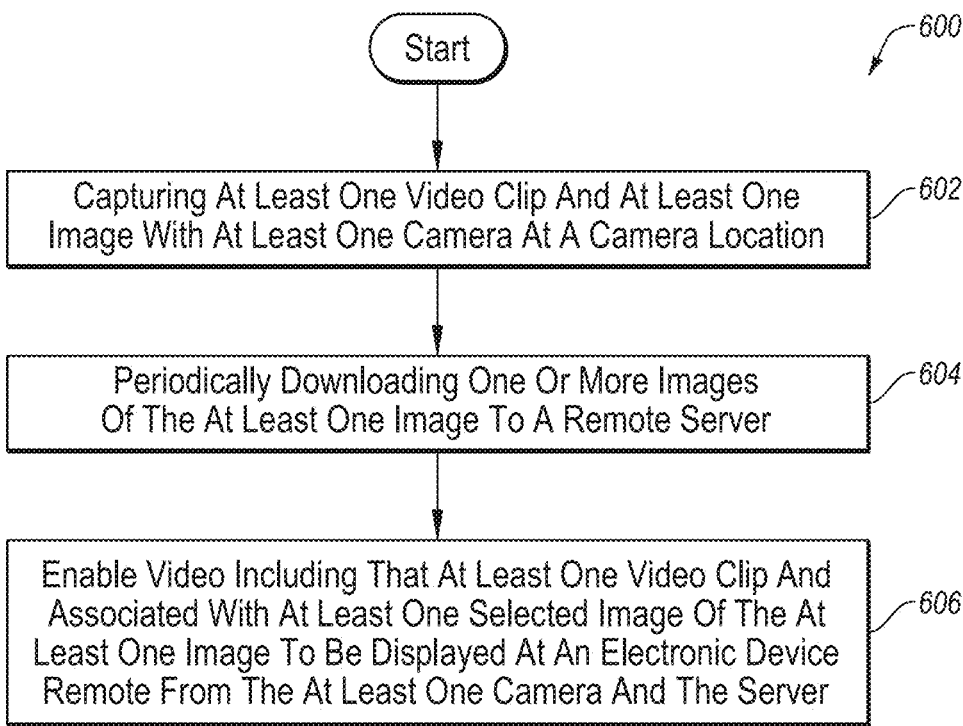
FIG. 7 is a flowchart of another method, in accordance with an embodiment of the present disclosure.

FIG. 7 is a flowchart of a method 600, according to an embodiment of the present disclosure. Method 600 includes capturing at least one video clip and at least one image with at least one camera at a camera location (act 602). Method 600 further includes periodically downloading one or more images of the at least one image to a remote server (act 604).

In addition, method 600 includes enabling video including the at least one video clip and being associated with at least one selected image of the at least one image to be displayed at an electronic device remote from the at least one camera and the server (act 606).

Figure 8:
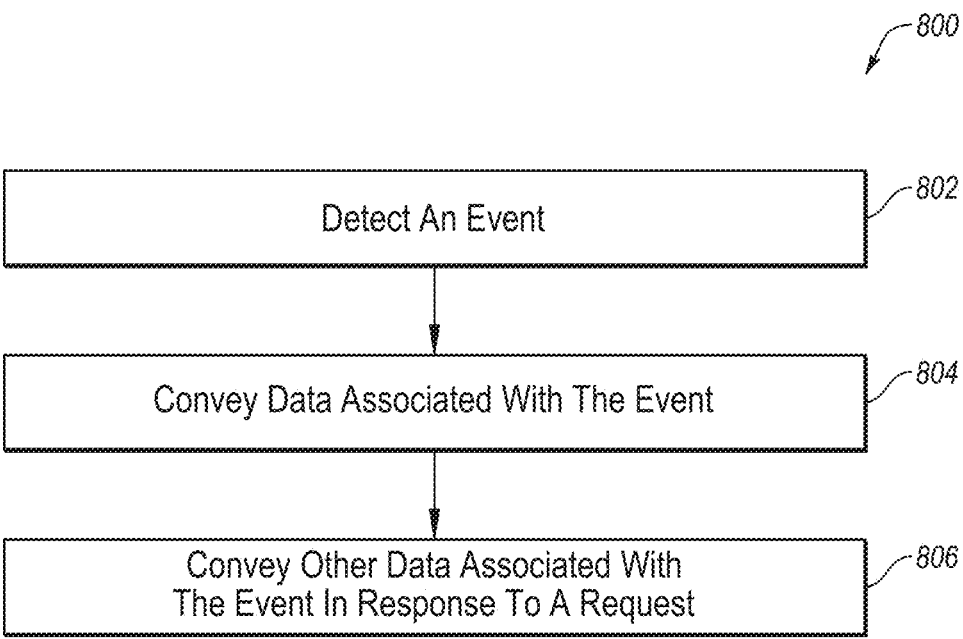
FIG. 8 is a flowchart of another method, in accordance with various embodiments of the present disclosure.

FIG. 8 is a flowchart of an example method 800, according to various embodiments of the disclosure. Method 800 may be arranged in accordance with at least one embodiment described in the disclosure. Method 800 may be performed, in some embodiments, by a device or system, such as system 200 (see FIG. 3A), system 220 (see FIG. 3B), unit 302 (see FIG. 3C), and/or another device or system. Although illustrated as discrete blocks, various blocks may be divided into additional blocks, combined into fewer blocks, or eliminated, depending on the desired implementation.

Method 800 may begin at block 802, wherein an event is detected via a unit, and method 800 may proceed to block 804. For example, the event may be detected via one or more sensors (e.g., cameras, microphones, or other sensors) of a mobile surveillance unit (e.g., unit 302 of FIG. 3B).

At block 804, data associated with the event is conveyed (e.g., uploaded, downloaded, transmitted, retrieved, etc.) to a remote device, and method 800 may proceed to block 806. For example, an alert (e.g., text, email, audio, and/or another alert) with at least some information regarding the detected event may be transmitted from the mobile surveillance unit to a server (e.g., server 264 of FIG. 3B) and/or another device (e.g., electronic device 262 of FIG. 3B).

At block 806, video data associated with the event, image data associated with the event, audio data associated with the event, or any combination thereof, may be conveyed (e.g., uploaded, downloaded, transmitted, retrieved, etc.) in response to a request associated with the conveyed data. For example, in response to a request (e.g., a user request, a system request, a request generated via an AI system, or any other request) associated with the previously transmitted data, video, audio, and/or image data associated with the event may be conveyed (e.g., uploaded, downloaded, transmitted, retrieved, etc.) from the mobile surveillance unit to the server 264, the remote device, and/or another device.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
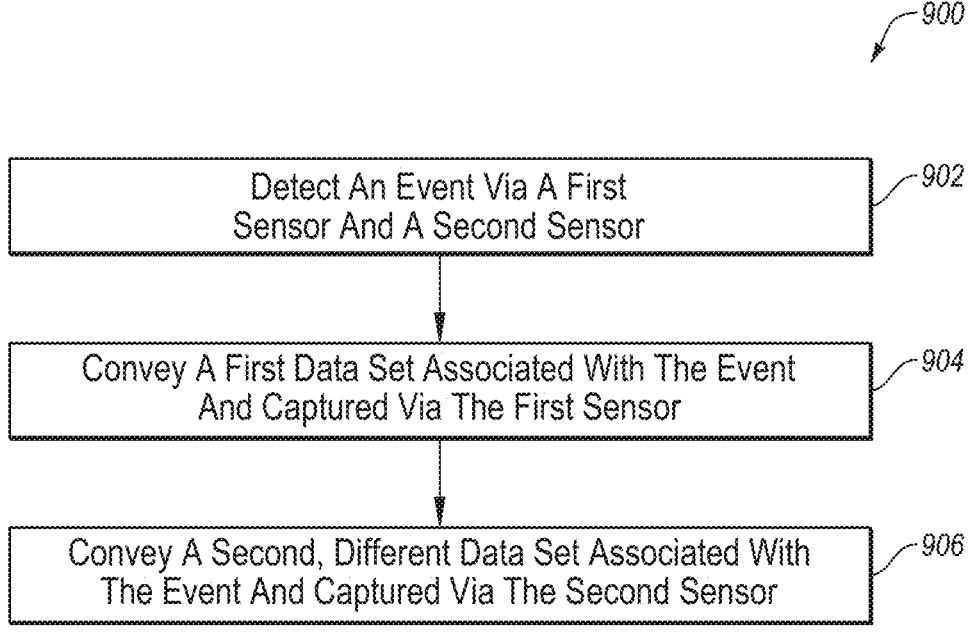
FIG. 9 is a flowchart of yet another method, in accordance with various embodiments of the present disclosure.

FIG. 9 is a flowchart of another example method 900, according to various embodiments of the disclosure. Method 800 may be arranged in accordance with at least one embodiment described in the disclosure. Method 900 may be performed, in some embodiments, by a device or system, such as system 200 (see FIG. 3A), system 220 (see FIG. 3B), unit 302 (see FIG. 3C), and/or another device or system. Although illustrated as discrete blocks, various blocks may be divided into additional blocks, combined into fewer blocks, or eliminated, depending on the desired implementation.

Method 900 may begin at block 902, wherein an event is detected via a mobile surveillance unit, and method 900 may proceed to block 904. For example, the event may be detected via one or more sensors (e.g., cameras or other sensors) of the mobile surveillance unit (e.g., unit 302 of FIG. 3B).

At block 904, a first data set associated with the event and captured by a first sensor of the mobile surveillance unit may be transmitted, and method 900 may proceed to block 906. For example, the first data set, which may include text data, image data, and/or video data, may be transmitted to a remote server and/or a user device. For example, the first sensor may include a camera or any other suitable sensor.

At block 906, a second, different data set associated with the event and captured by a second sensor of the mobile surveillance unit may be transmitted. For example, the second data set, which may be the same or different than the first data set, may be transmitted to a remote server and/or a user device. For example, the second sensor may include a camera or any other suitable sensor.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As will be appreciated by a person having ordinary skill in the art, embodiments of the present disclosure may not require any costly hardware onsite, thus decreasing implementation costs and monthly communications costs. Further, power requirements to run a remote camera system off-grid may be decreased. By keeping recording local to a camera, system 200 may record video 24 hours a day/7 days a week at high video quality without using any communication data across the cellular or satellite connection. When an "event" occurs that a user is interested in seeing, the user can use an online service portal to request the retrieval of video within the time frame of interest from the remote camera. In this way, only the video data of interest is transmitted over the cellular or satellite connection. The retrieved video may be at a high quality and the cost of transmitting a clip of video is much lower than streaming 24/7 hours a day/7 days a week. Power consumption of the remote camera system will be kept at a minimum because only a camera with a memory card (or low power external hard drive) is needed to record the video.

Although the foregoing description contains many specifics, these should not be construed as limiting the scope of the disclosure or of any of the appended claims, but merely as providing information pertinent to some specific embodiments that may fall within the scopes of the disclosure and the appended claims. Features from different embodiments may be employed in combination. In addition, other embodiments of the disclosure may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed:

1. A system, comprising:
an application program configured to:
cause, responsive to an event detected by a first device, text data including at least one of a time of the event, a location of the event, or an identification of a detected object of the event to be conveyed from the first device to at least one second device remote from the first device without other data including image data, video data, audio data, or any combination thereof, associated with the event being conveyed to the at least one second device with the text data; and
cause, in response to user input associated with the previously conveyed text data, at least some of the other data to be conveyed over a metered connection from the first device to at least one of the at least one second device or a third device.

2. The system of claim 1, wherein the text data comprises an alert, a text message, an email, meta data, or any combination thereof.

3. The system of claim 1, further comprising the first device, the first device comprising a mobile surveillance unit comprising at least one storage device coupled to one or more sensors.

4. The system of claim 3, wherein the one or more sensors comprise one or more cameras.

5. The system of claim 1, wherein the at least one second device comprises at least one user device, and the third device comprises a server, wherein the application program is further configured to cause at least one image captured via one or more cameras of the first device to be conveyed to the third device.

6. The system of claim 1, wherein the at least one second device comprises at least one user device, and the third device comprises a server, wherein the application program is further configured to cause images captured via one or more cameras of the first device to be periodically conveyed to the third device.

7. The system of claim 1, wherein the text data further includes at least one of a description of the detected event or an identification of the first device.

8. A method, comprising:
conveying, from a mobile surveillance unit and responsive to detection of an event, text data including at least one of a time of the event, a location of the event, or an identification of a detected object of the event to an electronic device remote from the mobile surveillance unit without conveying other data including image data, video data, audio data, or any combination thereof, associated with the event with the text data; and
conveying, from the mobile surveillance unit over a metered connection, at least some of the other data in response to a request associated with the previously conveyed text data.

9. The method of claim 8, wherein conveying the text data comprises conveying one or more of an alert, a text message, an email, or meta data.

10. The method of claim 8, wherein:
conveying the text data comprises conveying one or more of an alert or a text message associated with the event.

11. The method of claim 8, further comprising detecting the event via one or more cameras of the mobile surveillance unit.

12. The method of claim 8, wherein conveying the at least some of the other data comprises conveying the image data, the video data, the audio data, or the combination thereof to a cloud server, the electronic device, or both.

13. The method of claim 12, further comprising storing the image data, the video data, the audio data, or the combination thereof at the mobile surveillance unit.

14. A non-transitory computer-readable media storing instructions thereon that, when executed by a processor causes the processor to perform acts comprising:
cause text data including at least one of a time of the event, a location of the event, or an identification of a detected object of an event to be conveyed to a remote device responsive to the event being sensed without other data including image data, video data, audio data, or any combination thereof, associated with the event being conveyed to the remote device with the text data;

receive, from the remote device, input associated with the conveyed text data; and in response to receipt of the input, convey, to a server, the remote device, or both, at least some of the other data via a metered connection.

15. The non-transitory computer-readable media of claim 14, the acts further comprising: store the at least some of the other data at a mobile surveillance unit prior to the at least some of the other data being conveyed to the server, the remote device, or both.

16. The non-transitory computer-readable media of claim 14, wherein the text data comprises one or more of an alert, a text message, an email, or meta data.

17. The non-transitory computer-readable media of claim 14, wherein the text data is conveyed from a mobile surveillance unit to the remote device.

18. The non-transitory computer-readable media of claim 17, wherein the event is sensed via one or more sensors of the mobile surveillance unit.

19. The non-transitory computer-readable media of claim 14, wherein the remote device comprises a user device.

20. The non-transitory computer-readable media of claim 14, the acts further comprising: convey, prior to receipt of the input, an image related to the event to the remote device.

* * * * *